Patented Feb. 13, 1923.

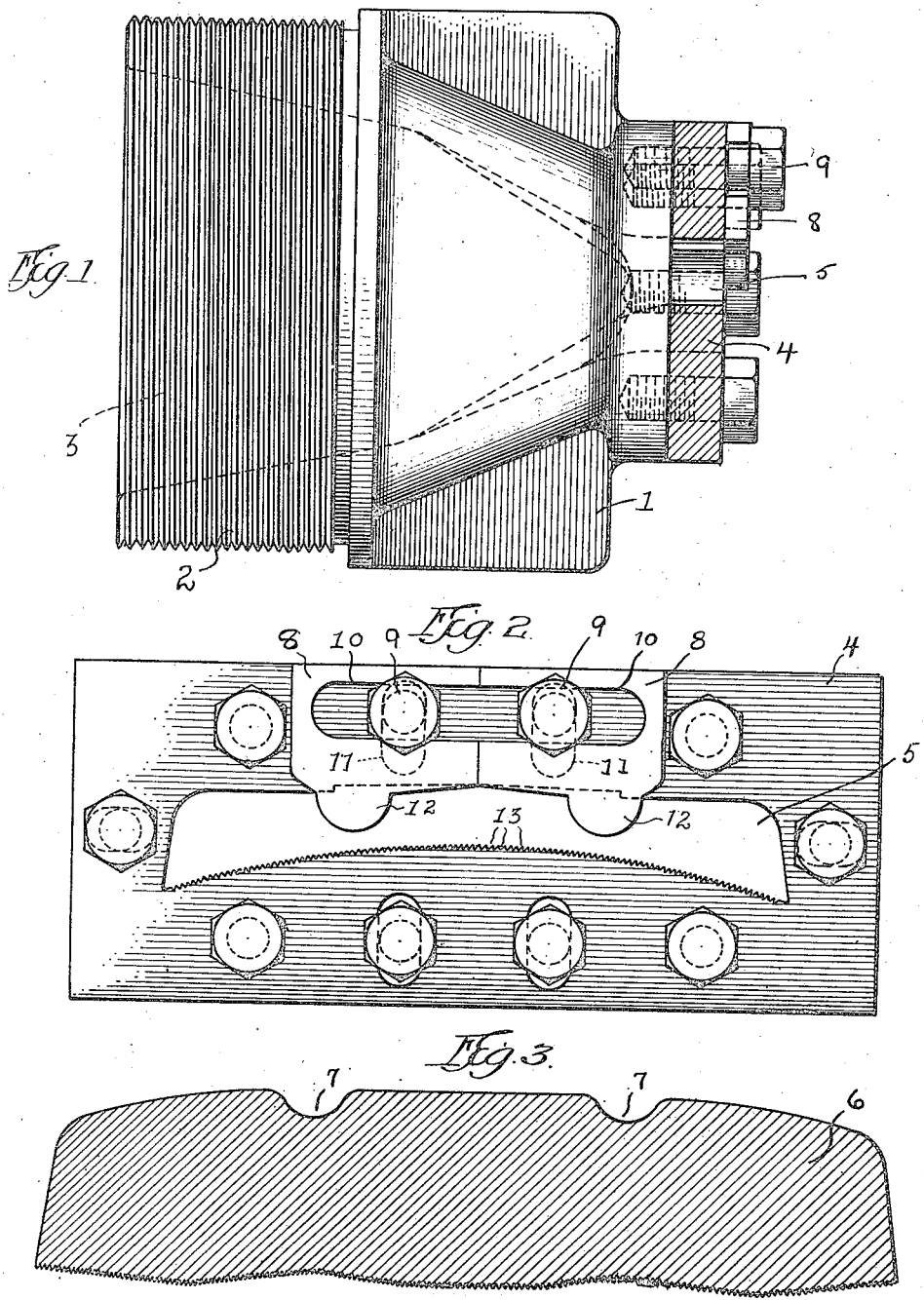

1,444,911

UNITED STATES PATENT OFFICE.

DANIEL E. GOODENBERGER, OF AKRON, OHIO, ASSIGNOR TO THE FIRESTONE TIRE AND RUBBER COMPANY, OF AKRON, OHIO, A CORPORATION OF OHIO.

TUBING DIE FOR MANUFACTURING SOLID TIRES.

Application filed November 5, 1918, Serial No. 261,250. Renewed July 10, 1922. Serial No. 573,921.

*To all whom it may concern:*

Be it known that I, DANIEL E. GOODENBERGER, being a citizen of the United States, residing at Akron, county of Summit, in the State of Ohio, have invented certain new and useful Improvements in Tubing Dies for Manufacturing Solid Tires, of which the following is a specification.

In the manufacture of solid tires, it has been thought heretofore that it was impossible to manufacture large tires by tubing or die expressing, owing to the difficulties attendant upon the extrusion of the rubber. It is the purpose of my invention to construct a die through which it is possible to extrude rubber strips of large cross section, which are manufactured into solid tires in accordance with the process set forth in the patent to William C. Stevens, No. 1,276,821, dated August 27, 1918.

It is also a purpose of this invention to construct a die which will form in the upper surface of the tire shallow grooves, which are molded in the finished tire to form ventilating and skid preventing grooves, and to so construct the groove making instrumentalities that they will be adjustable to take care of the differing densities and characteristics of the rubber stocks.

In the drawings accompanying this application is shown one form of die which has been perfected by me for the manufacture of tires of large cross section, the details of which may be varied within the scope of the invention.

Fig. 1 is a side elevation of the reducer or head.

Fig. 2 is a front view of the die plate, and

Fig. 3 is a cross section of the strip of rubber showing the shape it assumes after passing through the die.

In the drawings 1 represents the head or reducer which is provided with a screw-threaded portion 2 adapted to be inserted in any standard form of tubing machine. Through the center of the head is provided a funnel-shaped passage 3 which converges to conform more or less roughly to the aperture in the die plate 4. In the die plate is located the aperture 5 through which the tire is extruded and which gives it the final shape.

Referring now to Fig. 3, the strip of extruded rubber is shown at 6 and while it does not always assume the exact shape shown, the drawing is fairly representative of the manner in which the rubber behaves after leaving the die. In the process of experimentation it has been noted that the warm moving mass of rubber issuing from a die will contract horizontally across the tire and will expand vertically, particularly in the center of the tire, due, among other things, to the fact that the rubber flows more rapidly throughout the center of the die than at the ends thereof. The change in the cross section of the tire which takes place after leaving the die may be readily seen by comparing Fig. 3 of the drawing with the shape of the aperture 5 in the die plate. It will be seen that while the cross section of the tire is, roughly speaking, in the form of a trapezoid, the die opening is plano-convex, the curvature of the lower side being such as to bring the opening in the center to nearly one-half of the overall height of the opening.

If it is desired to form grooves or valleys 7 in the tread of the tire, there is mounted on the outside of the die plate, two oppositely faced plates 8 held in place by bolts 9, passing through horizontal slots 10 in the plates and through vertical slots 11 in the die plate so that the grooving plates may be adjusted horizontally to locate the grooves in the tire, and vertically to allow for differing densities of the stock. The under sides of the grooving plates are provided with fingers or lobes 12 which project down over the die opening to form the grooves. It will be noted that the fingers 12 extend over the opening in the die plate much further than the depth of the grooves in the extruded tire would seem to indicate, but I have found that the movement of the rubber causes the grooves to fill up as it leaves the die. The lower side of the die opening is serrated as at 13 to provide longitudinal grooves in the base of the tire which facilitates the union between the bottom of the tire and the hard base.

The invention herein is not limited to the exact form shown, but changes and modifications may be made within the scope of the appended claims without departing therefrom or sacrificing any of the benefits.

I claim:

1. In a die for extruding a solid rubber tire, a die plate having an opening therein, a forming plate mounted on said die plate and extending over the opening therein to determine the contour of said tire, the lower wall of said opening being serrated.

2. In a die for extruding a solid rubber tire, a die plate having an opening therein, a forming plate mounted on said die plate and extending over the opening therein to determine the contour of said tire, the lower wall of said opening being serrated and arched upwardly from the lower corner of the opening.

3. In a die for extruding a tread portion of a rubber tire, which is approximately trapezoidal in cross section and provided with a shallow groove in its upper surface, a die plate having an opening which is formed by a substantially straight upper line, and an upwardly arched lower line, the uppermost point of the lower line being substantially one half of the overall height of the opening and a plate located above the opening and having a projection extending over the opening to or beyond the midway point between the upper and lower lines.

4. In a die for extruding a tread portion of a rubber tire having a groove in its upper surface, a die plate having an opening, the opening being provided with an upper surface approximately straight and a lower surface curved upwardly uniformly from the lower corners of the opening to the center, and a grooving plate mounted over the die and projecting within the opening.

5. In a die for extruding solid tires having grooves in their upper surfaces, a die plate having an opening, the opening being provided with an upper surface approximately straight and a lower surface curved upwardly uniformly from the lower corners of the opening to the center, and grooving plates adjustably mounted over the die opening to project within the opening.

6. In a die for extruding solid tires having grooves in their upper surfaces, a die plate having an opening, the opening being provided with an upper surface approximately straight and a lower surface curved upwardly uniformly from the lower corners of the opening to the center, and grooving plates mounted over the die to project within the opening, said plates being secured by means permitting lateral and vertical adjustment.

7. In a die for extruding a solid tire having a groove in its upper surface, a die plate having an opening therein, a grooving plate mounted on said die plate, said grooving plate having a projection extending over the die opening to form the groove in the tire.

8. In a die for extruding a solid tire having a groove in its upper surface, a die plate having an opening therein, a grooving plate mounted on said die plate, said grooving plate having a projection extending over the die opening to form the groove in the tire, the lower wall of said opening being serrated.

9. In a die for extruding solid tires having grooves in their upper surfaces and serrations on their lower surfaces, a die plate having an opening, the opening being provided with an upper surface approximately straight and a lower surface curved upwardly uniformly from the lower corners of the opening to the center, a grooving plate mounted over the die to project within the opening, the lower curved surface of the die being provided with serrations.

DANIEL E. GOODENBERGER.